Aug. 23, 1927.

H. O. BONNAR

PRINTED FORM

Filed Aug. 26, 1922

INVENTOR:
HENRY O. BONNAR
BY
J.E. merkel
ATTORNEY.

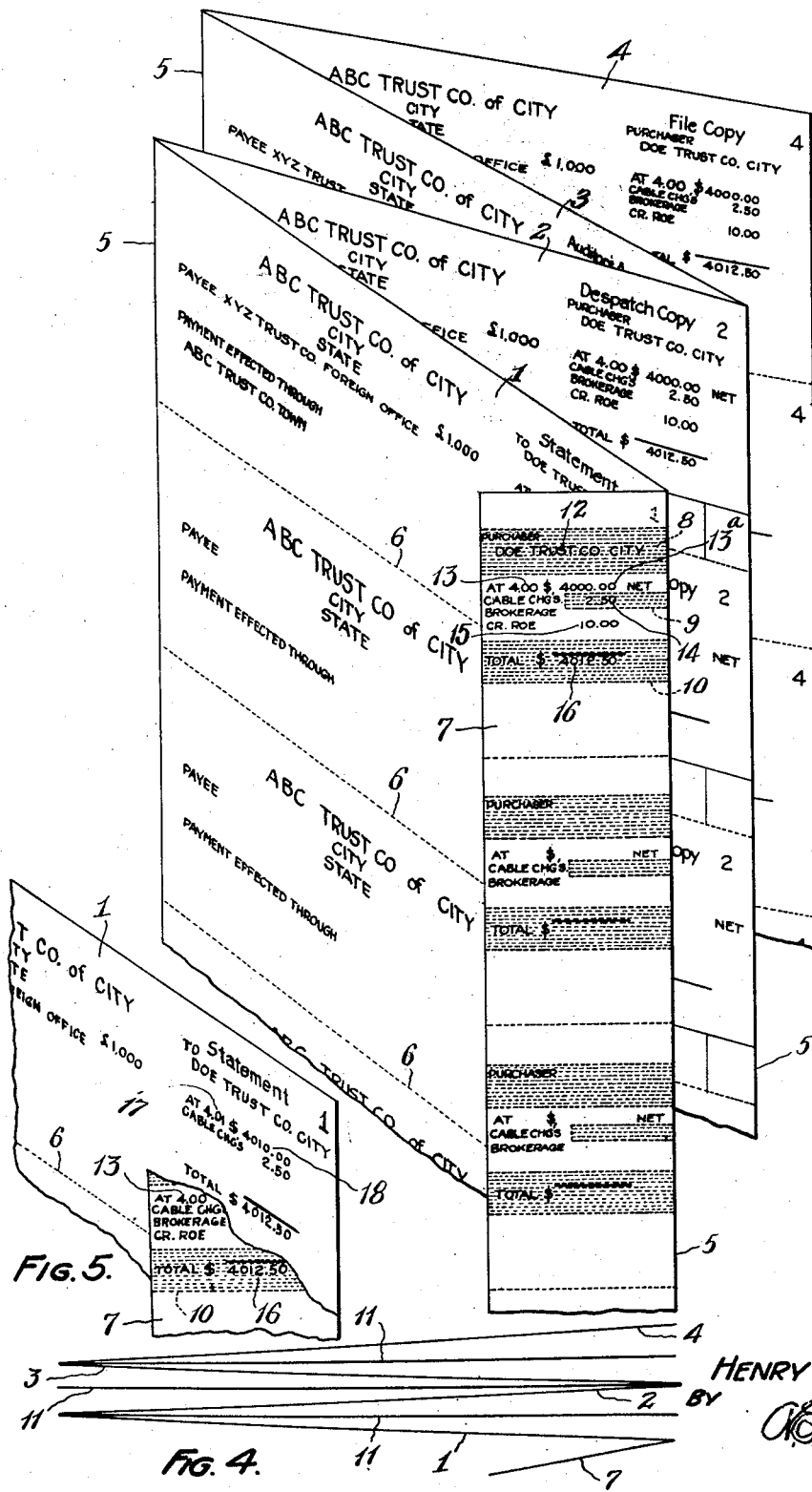

Patented Aug. 23, 1927.

1,639,683

UNITED STATES PATENT OFFICE.

HENRY O. BONNAR, OF NEW YORK, N. Y., ASSIGNOR, BY MESNE ASSIGNMENTS, TO GILMAN FANFOLD COMPANY, LIMITED, OF NIAGARA FALLS, NEW YORK, A CORPORATION OF ONTARIO, CANADA.

PRINTED FORM.

Application filed August 26, 1922. Serial No. 584,406.

My invention relates to what is known as duplicating or "fan-fold" printed forms such as are shown, for example in the Carey Patent #1,198,326 or in the Ingersoll Patent #1,368,729.

The object of the invention is to provide a duplicating form of a character such that matter of a confidential nature printed upon one of said forms may be omitted from one of the others.

The said invention consists of means hereinafter fully described and particularly set forth in the claims.

More specifically the invention consists in adding to a set of duplicating forms, a supplementary form whose reverse side is partially provided or covered with a transfer material, or carbonized, whereby I am enabled to fill out the supplementary form with the complete information, transfer same to all of the remaining forms but the first one thereof, from which such data as it is desired to hold as confidential may be omitted.

The annexed drawing and the following description set forth in detail certain means embodying my invention, the disclosed means, however, constituting but one of various mechanical forms in which the principle of my invention may be applied.

In said annexed drawing:—

Figure 1 represents a plan of the obverse side of a portion of an unfolded sheet containing a multiplicity of printed forms, and embodying my invention.

Figure 2, represents a plan of the reverse side of such sheet.

Figure 3 represents upon an enlarged scale, a perspective view of the sheet partially folded.

Figure 4 represents a transverse section of the sheet partially folded.

Figure 5 represents a perspective view of a fragmentary portion of the form with a part of the supplementary form torn away.

As one particular form of my invention, I have shown in the drawing, a sheet bearing printed forms required to record a transaction in the sale of foreign exchange, in which a brokerage charge is made and the name of the broker recorded together with the amount of brokerage with which he is to be credited, and in which the sheet is provided with the usual lines 5 of longitudinal perforations upon which said sheet may be folded, as shown in Figure 3. Transverse lines 6 of perforations may be provided, if desired, for convenience in separation.

The main sheet bearing the blank forms, when folded along the longitudinal fold lines 5 as shown in Figs. 3 and 4, forms a fan-folded composite traveler strip. The fan-folded traveler strip, therefor, comprises individual record strips arranged in overlapping or superposed relation as shown, each strip having a series of blank forms arranged therealong, and the individual blank forms being separated longitudinally by means of the transverse perforated lines 6, thus separating or dividing each separate record strip into a longitudinal series of attached cards or form leaves, each having a blank form thereon. These cards or form leaves are arranged across the main sheet in a transverse series and are in superposed or overlapping relation with each other when fan-folded, the blank forms thereon being in superposed registering relation with each other for manifold inscripton. These form leaves or form-sheets cooperate with each other to provide manifold copies of a transaction, as described more fully below. This composite fan-folded strip is adapted for use in typewriters or similar recording machines, so that the unused parts thereof are caused to travel forwardly in the machine in a unitary strip as the forward parts thereof are filled in with data and torn off.

Each of the individual record strips bears a series of blank forms indicated respectively at 1, 2, 3 and 4. The uppermost series as shown in Fig. 3 contains "statement forms which go to the purchaser"; the other forms are respectively, "displatch copy," auditor's advice of cable", and "file copy". One or more additional series of desired forms may be added, if required, only four being herein disclosed, so as to avoid unnecessary complication. In the particular form of invention disclosed, the statement is always the first of the main blank forms.

To the outer or free edge of the statement record strip is attached a supplementary or auxiliary strip, which is of less width than the other record strips. This auxiliary strip is co-extensive longitudinally with the other strips, and may be folded over the end of the statement record strip to lie in contact with the forms of said strip. The main function of this narrow strip is to assist in the selective entry of certain data on the other record strips, as described more fully below.

This supplementary or auxiliary strip has printed upon its obverse face certain fixed and uniform parts of data to which typewritten data is added to make the information complete. The perforated lines 6 are extended across the auxiliary strip so as to divide the latter into a series of attached auxiliary leaves or form leaves, each having thereon the requisite forms and accompanying fixed data. In the illustrated example this fixed data consists of the word "Purchaser", adjacent to which the name of the purchaser is written; the word "at" opposite which the rate at which the exchange is sold, is written; the word "net" opposite the word "at" and adjacent to which the net amount is written; the words "Cable charges" opposite which the amount of charges is written; the word "Brokerage" adjacent to which the amount of brokerage and the name of the broker is written; and the word "Total" opposite which the total amount is written.

A limited area 8, of the reverse side of the supplementary form leaf opposite the word "Purchaser," is provided with transfer material, or carbonized, as shown in dotted lines in Figure 3; a limited area 9, opposite the words "Cable charges" is similarly carbonized; and a limited area 10, is likewise carbonized, opposite the word "Total". The areas on the reverse side opposite the remainder of the fixed printed matter are uncarbonized.

All of the said printed matter is duplicated upon all of the main forms or form leaves with the exception of the "Statement" from which the words "Net" and "Brokerage" are omitted, as shown in Figure 2. Those portions of the obverse sides of all of the main forms which lie beneath the supplementary form, are unprovided with transfer material.

In using the composite fan-folded traveler strip above disclosed, said strip is placed in a duplicating typewriting machine, or similar manifolding machine, carbon sheets 11 being placed between the adjacent superposed individual record strips, as shown in Fig. 4.

The required typewritten matter is now added to the supplementary form. In the illustrated example, the name of the purchaser is added as at 12; the rate is added as at 13; the $ equivalent at such rate of exchange shown at 13, is added in front of the word "net", as at 13ª; the charges are added as at 14; the name of the broker and the amount of the brokerage is added as at 15; and the total amount is added as at 16, Figure 3.

All of the typewritten matter is duplicated on all of the main form leaves with the exception of the "Statement", upon which only such matter is duplicated as is written over the carbonized areas, namely: the name of the purchaser, the amount of cable charges, and the total. The rate, net amount, name of the broker and the amount of brokerage are not duplicated upon the "Statement".

After such typewriting operation is completed the next set of form leaves is shifted into position and the carbon sheets shifted, as will be understood by those skilled in the art.

The supplementary form which has been supplied with the typewritten matter is then torn off and destroyed, leaving the end of the statement exposed. The statement sheet or leaf is then put back into position on the machine, and the required missing typewritten matter supplied thereto. In this instance such matter would consist of the rate, which would be the rate written on the supplementary form plus the brokerage rate, as at 17; the amount, which would include the net amount to the seller plus the brokerage, as at 18. The sum of the column of figures on the statement will therefore equal the total already recorded thereon and upon all the other forms.

The statement is then sent to the purchaser, but as will be noted, the confidential information as to the identity of the broker and the amount of brokerage paid him is omitted therefrom, while the total amount corresponds with the total on the other main forms.

By making the supplementary form of markedly less or different width than the main forms they can always be readily distinguished and will not, hence, be mistaken and filed in place of any of the main forms.

What I claim is:

1. In combination, a composite traveler manifolding strip including a plurality of superposed record strips, each of a plurality of said superposed record strips having a series of blank forms therealong arranged respectively in superposed manifolding relation to provide a series of sets of superposed form leaves with registering blank forms, said blank forms including fixed incomplete data with accompanying recording areas for receiving inscriptions to complete said data, and an auxiliary strip connected along its longitudinal edge to one of said superposed strips and overlapping certain parts thereof, said auxiliary strip having a series of blank forms arranged therealong and positioned for registering respectively with certain parts of the blank forms of the superposed record strips, the back face of said auxiliary strip having transfer material at points thereof opposite certain of said recording areas and being free from transfer material at points thereof opposite certain of said recording areas.

2. In combination, a composite fan-folded traveler strip having a plurality of overlapping record strips with sets of registering blank forms arranged in a series along said traveler strip, and an auxiliary strip attached to said traveler strip and having a series of blank forms arranged therealong registering respectively with parts of said first mentioned blank forms, said auxiliary strip contacting at its back face against the front face of the adjacent series of blank forms and having upon its back face opposite the blank forms thereof localized areas, part having transfer material thereon and part being free from transfer material, so as to effect selective manifold inscription upon the blank forms of said adjacent series.

3. In combination, a composite fan-folded traveler strip having a plurality of overlapping record strips with sets of registering blank forms arranged in a series along said traveler strip, and an auxiliary strip of less width than the other supposed record strips and attached to said traveler strip, and having a series of blank forms arranged therealong registering respectively with parts of said first mentioned blank forms, said auxiliary strip contacting at its back face against the front face of the adjacent series of blank forms, and having upon its back face opposite the blank forms thereof localized areas, part having transfer material thereon and part being free from transfer material, and a certain part of the forms of the auxiliary strip being variant from the opposed part of the form of the adjacent strip, but similar to the opposed part of the form of another of said overlapping record strips.

4. A device of the character described, comprising a plurality of leaves of equal size attached end to end in series, and fan folded to position one upon another, said leaves having forms printed thereon and arranged on opposite faces of adjacent leaves, sheets removably placed between said leaves and having transfer material on one surface thereof, a supplementary leaf of less width than the above named leaves attached to one end of the series, said supplemetary leaf having transfer material on part of one of its surfaces the other parts of said surfaces being free of transfer material.

5. A duplicating device including a plurality of leaves arranged in a plurality of attached strips so that the leaves of each strip may be fan-folded upon each other, the alternate leaves of each series having forms printed on their opposite faces, a plurality of sheets of carbonized paper separate from said leaves and removably inserted between the folds of the fan-folded leaves, and a supplemental leaf of less width than the other leaves and attached to one end of each of said strips of leaves and having parts of its reverse face provided with transfer material and parts thereof unprovided with transfer material and disposed opposite to the blank spaces of the form of one of the leaves.

Signed by me this 22nd day of August, 1922.

HENRY O. BONNAR.